United States Patent [19]

Windau

[11] Patent Number: 5,123,517
[45] Date of Patent: Jun. 23, 1992

[54] LOW PROFILE UNPOWERED CONVEYOR AND METHOD

[75] Inventor: Thomas H. Windau, Sandusky, Ohio

[73] Assignee: Lake Erie Welding & Fabricating, Sandusky, Ohio

[21] Appl. No.: 605,917

[22] Filed: Oct. 30, 1990

[51] Int. Cl.⁵ .............................................. B65G 47/34
[52] U.S. Cl. ........................ 198/463.3; 193/35 SS; 414/286; 414/276; 198/465.2; 198/465.3
[58] Field of Search .............. 198/372, 465.2, 463.3, 198/465.3, 782, 346.1, 535; 193/35 SS, 35 MD; 414/276, 286, 532, 533–536

[56] References Cited

U.S. PATENT DOCUMENTS

| 4,706,793 | 11/1987 | Masciarelli | 193/35 MD X |
| 4,747,477 | 5/1988 | Benz et al. | 198/372 X |
| 5,064,046 | 11/1991 | Janotik et al. | 193/35 SS |

FOREIGN PATENT DOCUMENTS

| 101107 | 2/1965 | Denmark | 193/35 SS |
| 1493746 | 7/1966 | France | 193/35 SS |
| 891545 | 12/1981 | U.S.S.R. | 198/782 |
| 1084213 | 4/1984 | U.S.S.R. | 198/463.3 |
| 1107679 | 3/1968 | United Kingdom | 193/35 SS |

Primary Examiner—Joseph E. Valenza
Attorney, Agent, or Firm—Renner, Otto, Boisselle & Sklar

[57] ABSTRACT

A low profile unpowered conveyance utilizes air actuators to tilt sequentially sections of idler roller conveyors to move loads such as palletized bins from one section to an adjoining section. The sections may be arranged in a line, loop or other arrangement. The sections are tilted by air actuators which are preferably low profile pneumatic air bags or springs. In one form a pair of air bags support a pivotally mounted entry section through a harness and when the air bags are deflated the entry section pivots downwardly with respect to the conveyor section. When the air bags are partially inflated the entry section is held horizontal. When the air bags are further inflated, the entire section tilts. The entire section tilts only when the succeeding section is clear and concurrently the entry section of the succeeding section also tilts to be aligned with the prior section providing an inclined idler roller ramp to permit the load to roll to the succeeding section. When the proper position of the load is achieved, the entry section returns to a horizontal position and the load rolls to a stop on the succeeding section. Each section includes a load stop which is retracted when the section is tilted. The entry section may be positioned on one or both ends of each section. In another form, the conveyor sections are supported by air actuators at each end and when one section tilts, the succeeding section also tilts so that both are aligned and tilted. Flank sections are provided for moving the loads around corners with such flank sections having intersecting idler roller conveyor sections. The system avoids load-to-load contact and operates entirely with low pressure air and low voltage wiring for the controls.

46 Claims, 9 Drawing Sheets

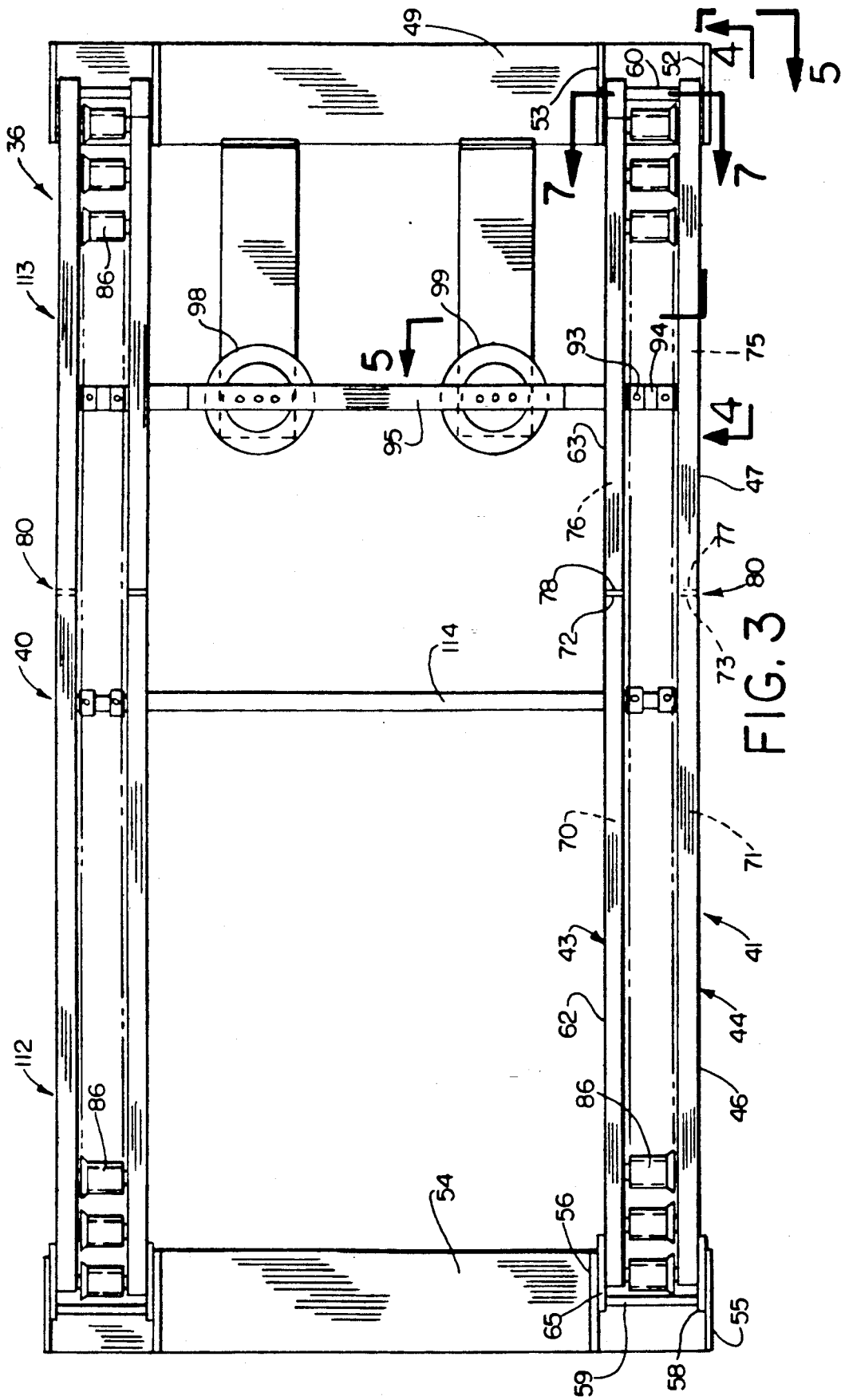

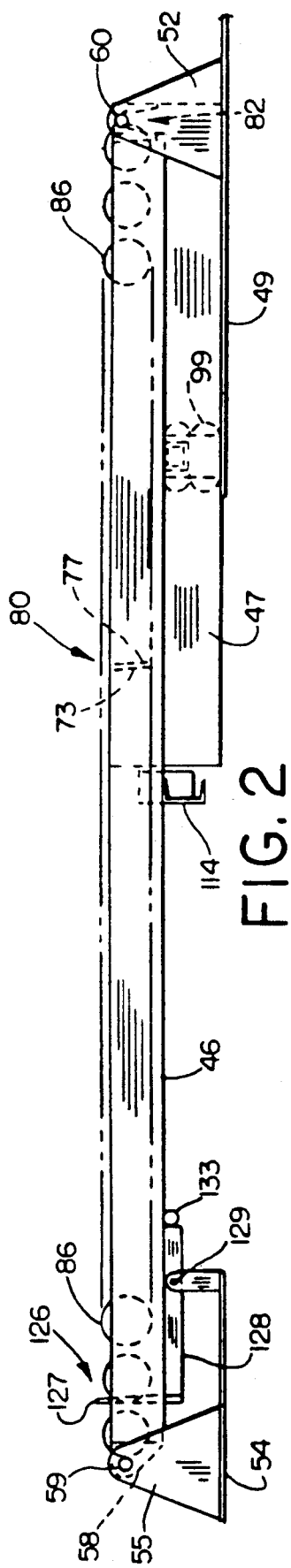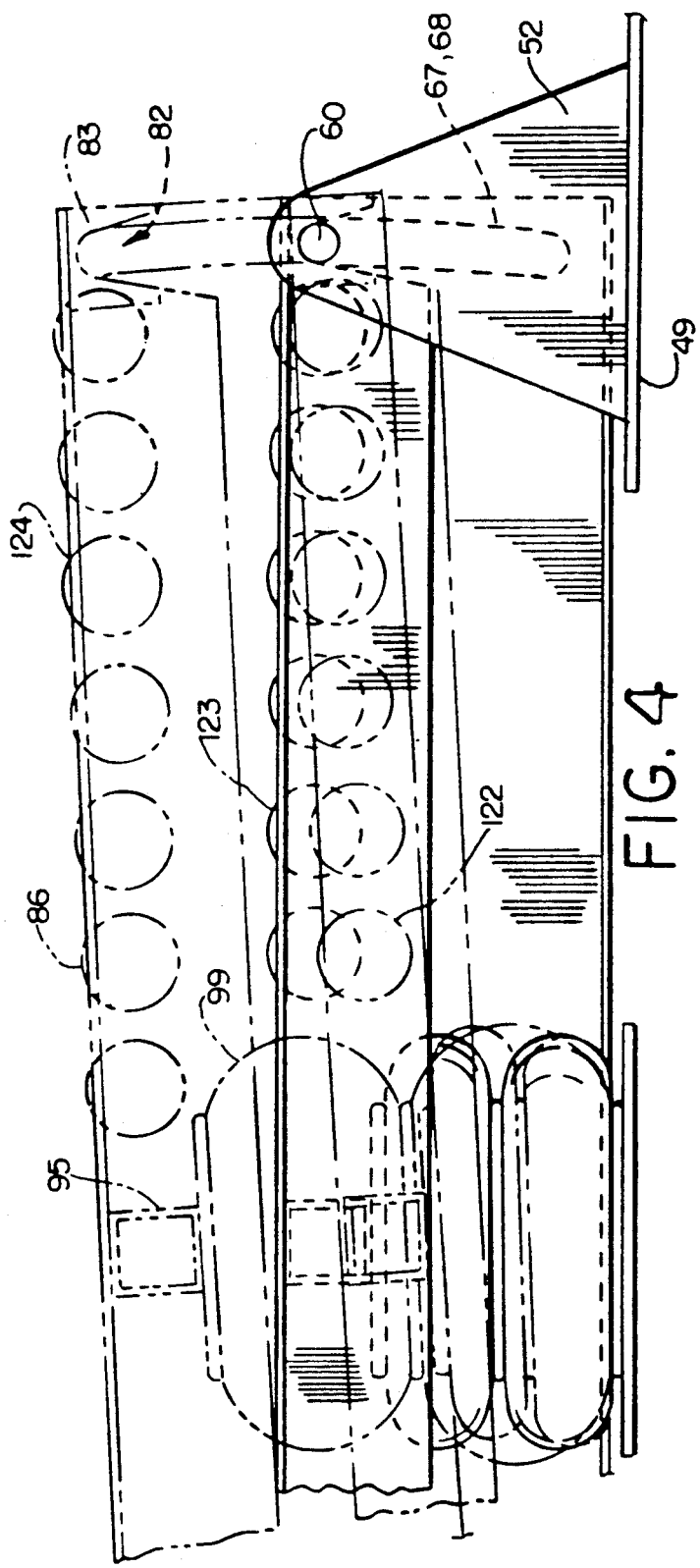

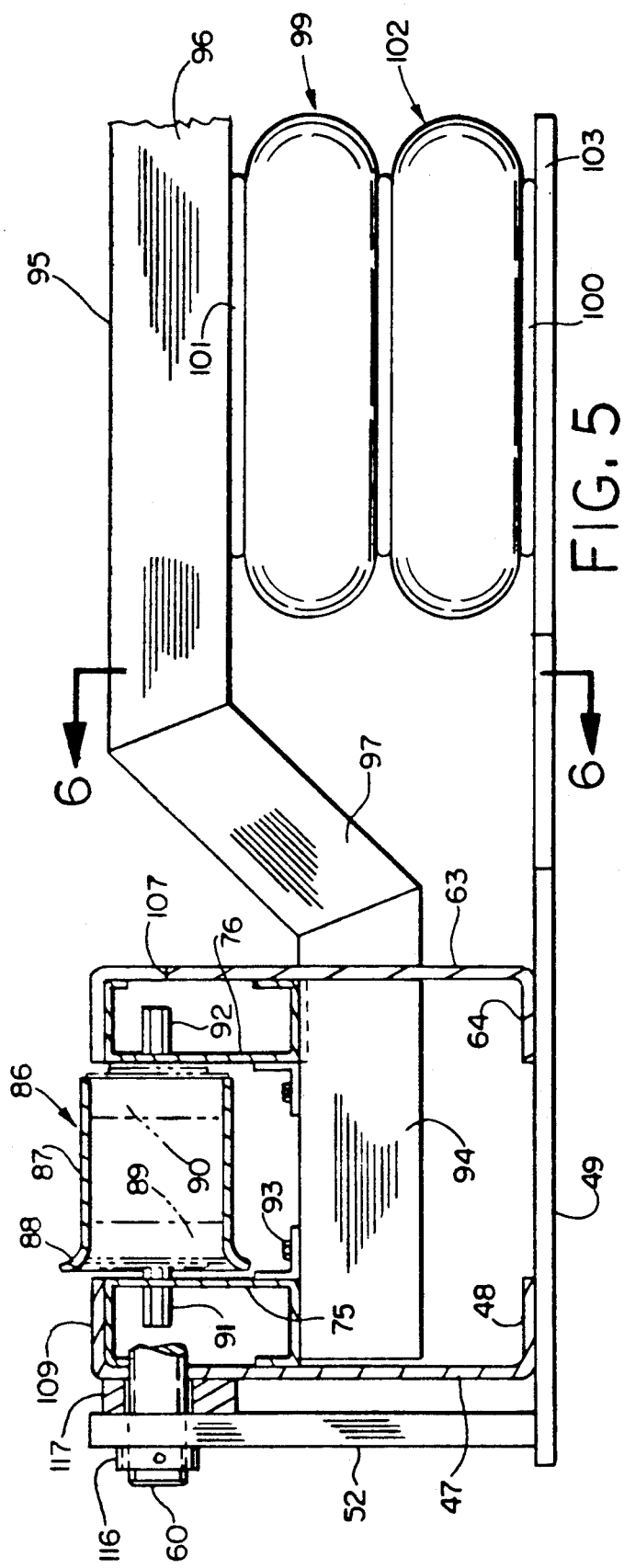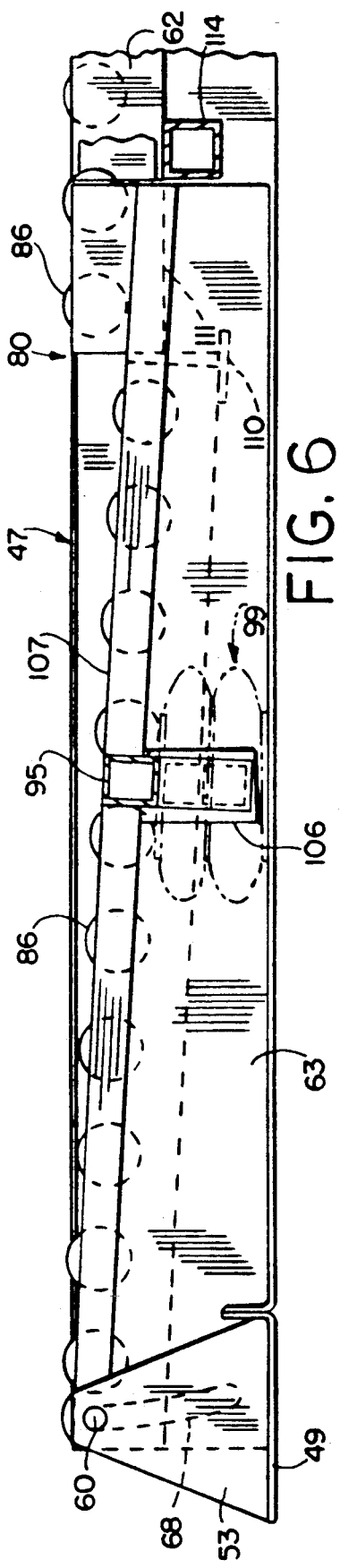

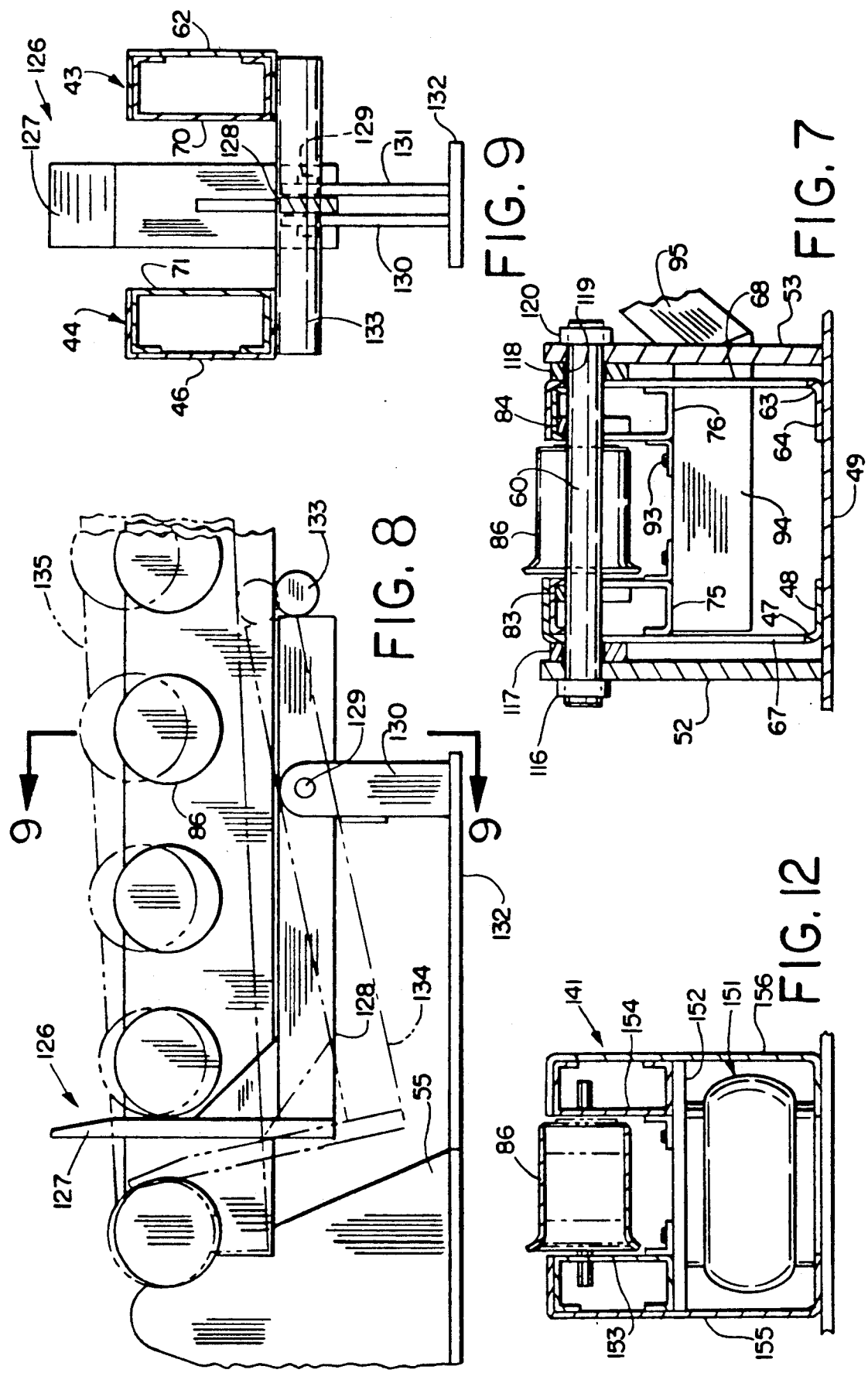

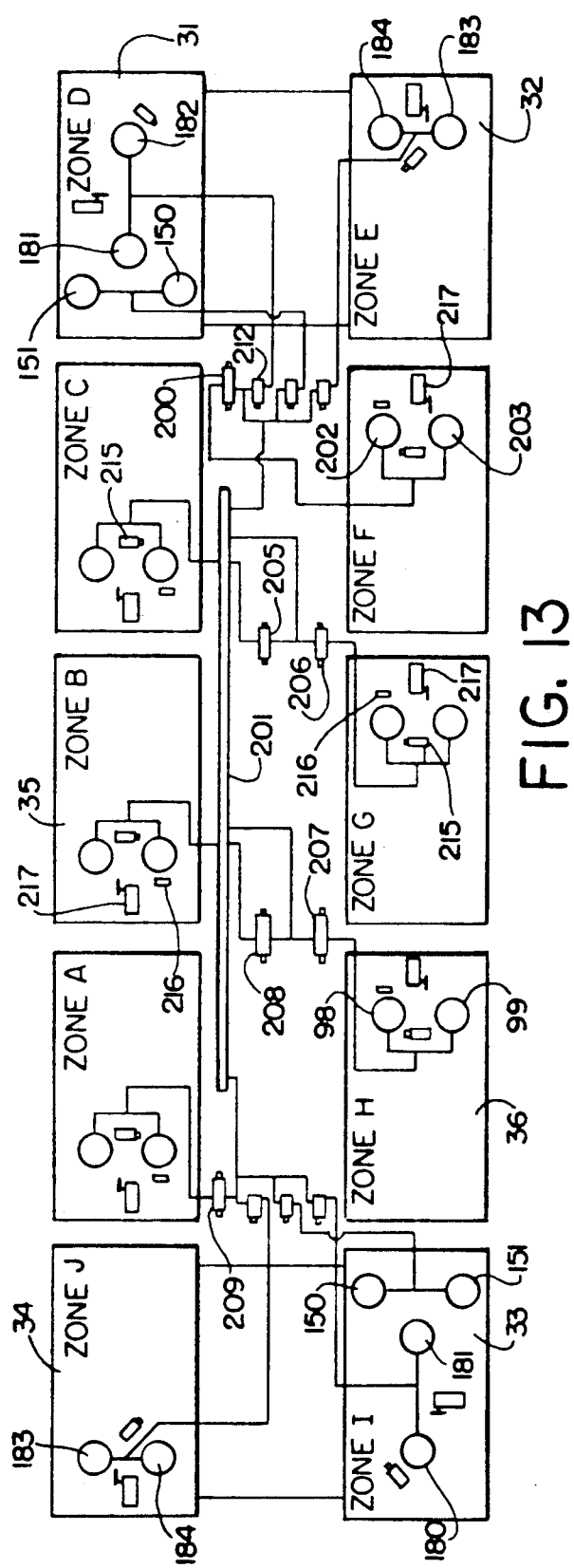
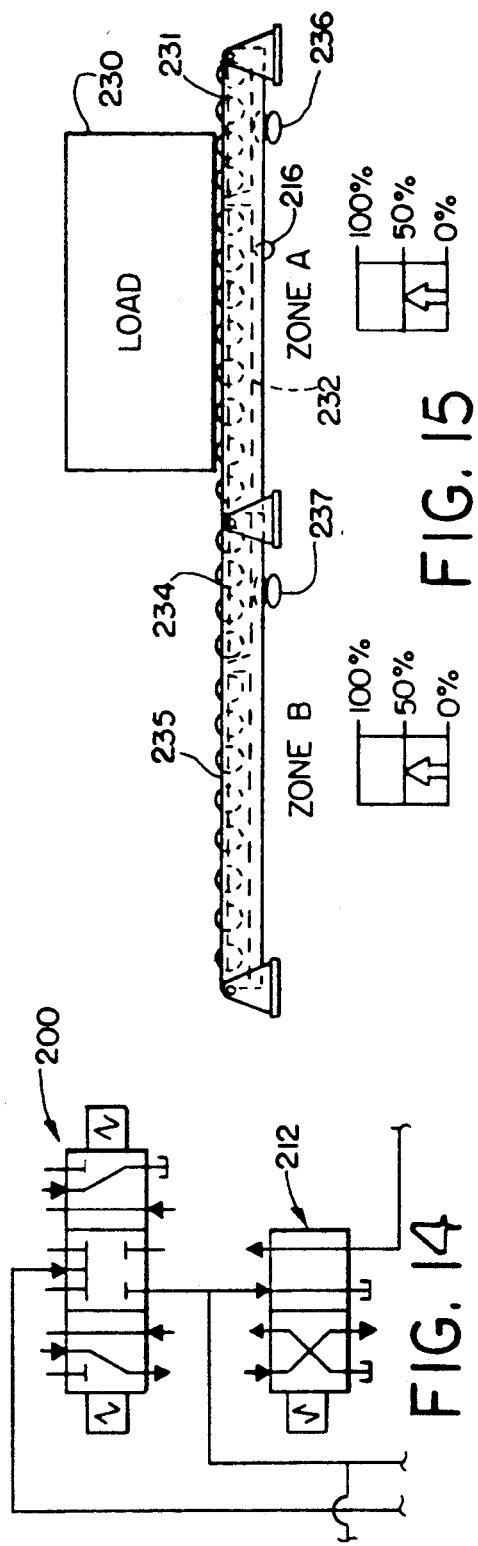
FIG. 13
FIG. 14
FIG. 15

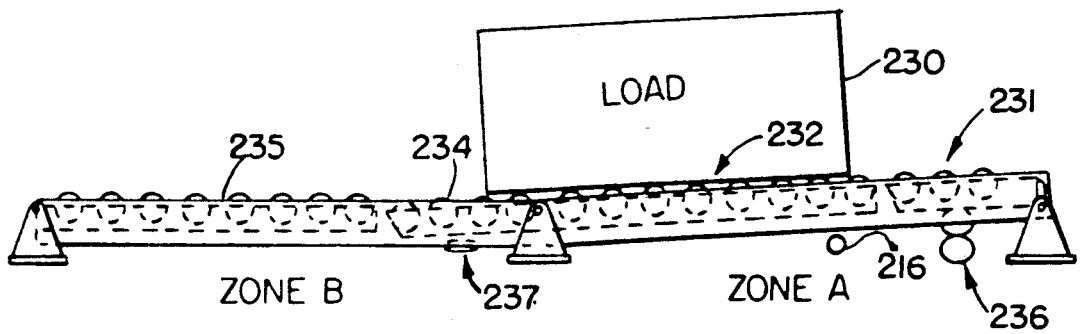
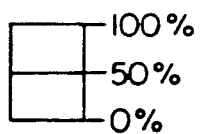 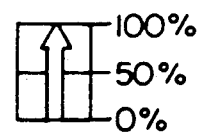
FIG. 16
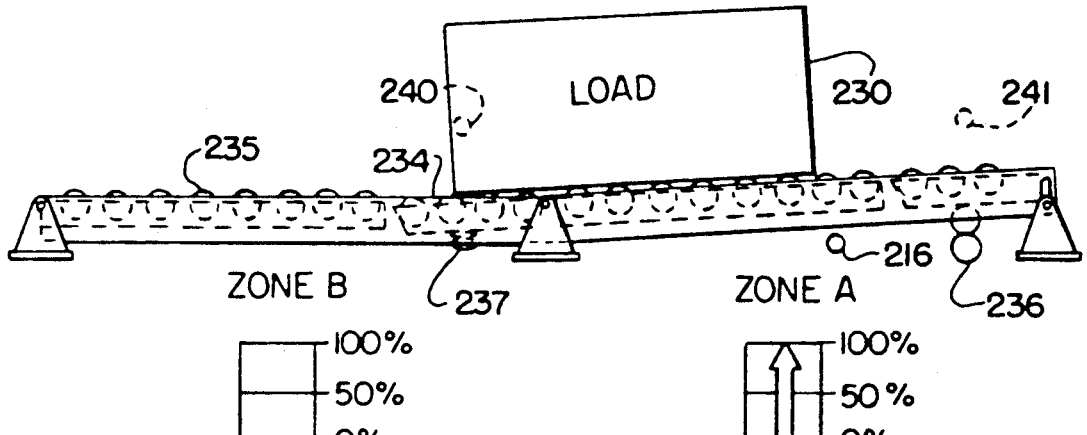
FIG. 17
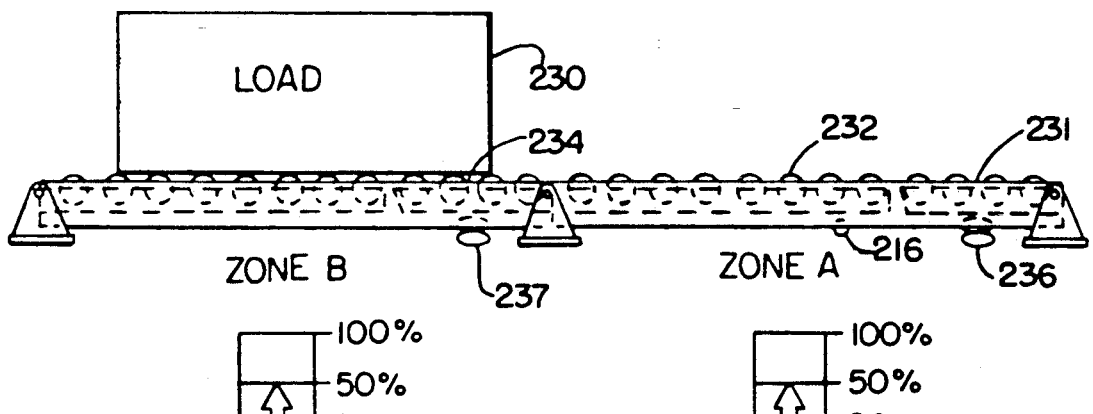
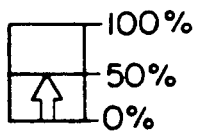 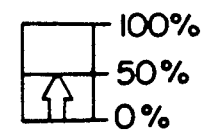
FIG. 18

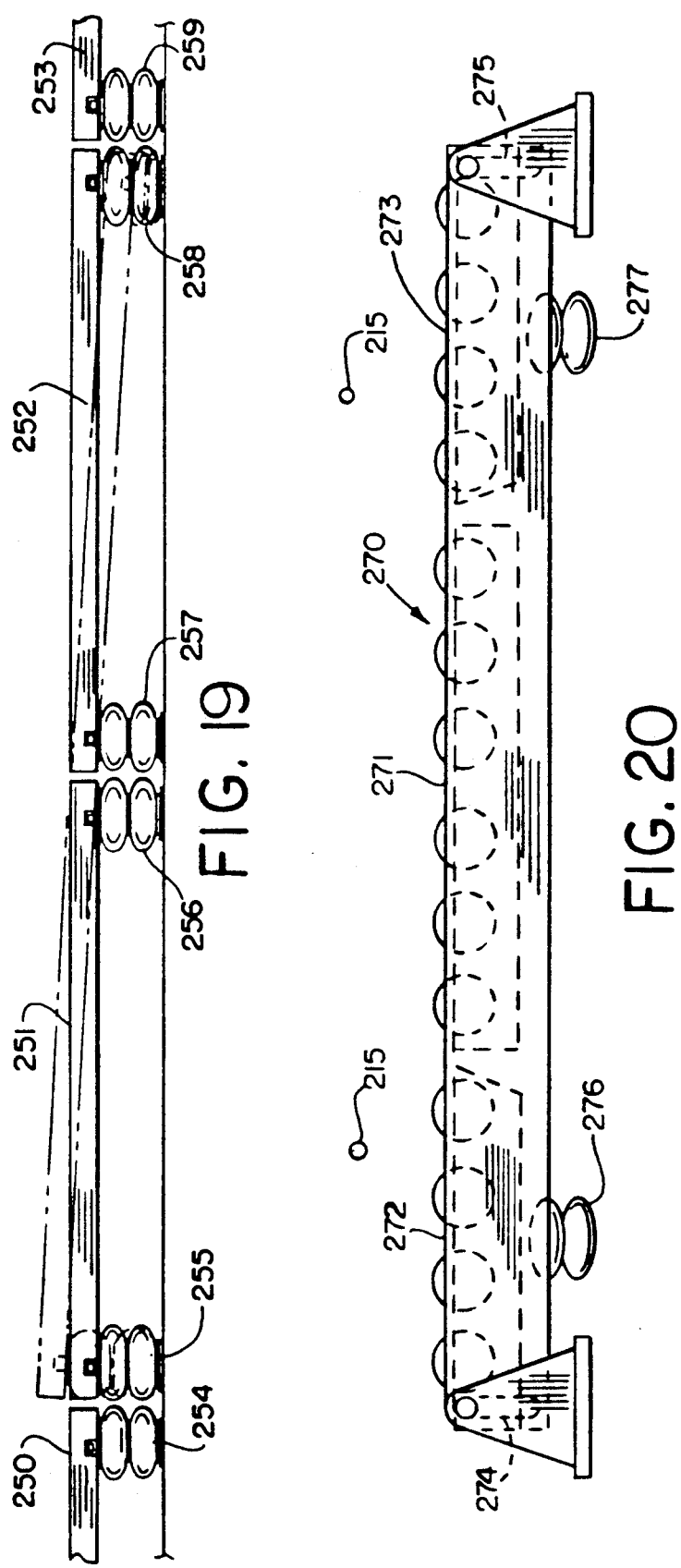

LOW PROFILE UNPOWERED CONVEYOR AND METHOD

This invention relates generally as indicated to a low profile unpowered conveyor and method for moving discrete loads, and more particularly, to a conveyor system having a layout arrangement of a plurality of idler conveyor sections each of which may be tilted to cause the load to roll by gravity from one section to an adjoining section. The load is moved along the layout by tilting sequentially each succeeding section.

BACKGROUND OF THE INVENTION

Belt conveyors are widely used for conveying discrete loads. For some, powered devices are required to push the loads along the conveyor system. Gravity roll conveyors are also widely used. It is common to unload vehicles by use of a gravity roller ramp. Such ramps are not suitable for larger discrete loads where control and positioning are important.

Powered conveyor systems require motors, chains, belts and the like, usually have a high profile, are noisy, and can be dangerous. Accordingly, there is a need for a safe and low noise, low profile conveyor which does not utilize electric motors, but rather which utilizes only low pressure air and low voltage current for controls. There is also such need for a conveyor which can move discrete loads in a controlled and programmed manner without contact with each other.

One such discrete load is the large bins in which automobile parts are customarily packed and shipped. They are usually handled by fork lift trucks on special pallets. This type of handling makes it difficult to position the bin in the proper position and to have a new bin properly positioned at the proper time. The present handling system requires an excessive amount of floor space, lift truck aisles, creates hazards and promotes inefficiency.

Accordingly, a low cost, low profile conveyor system which can inventory a number of bins, position the bins sequentially at the proper location, and permit the lift truck operator flexibility greatly improves the efficiency of the assembly operation.

There is also a need for a discrete load, non-powered conveyance system which can be produced in modules or sections to be assembled into the desired layout or system such as lines or loops.

SUMMARY OF THE INVENTION

A low profile unpowered conveyance utilizes air actuators to tilt sequentially sections of idler roller conveyors to move loads such as palletized bins from one section to an adjoining section. The sections may be arranged in a line, loop or other arrangement. The sections are tilted by air actuators which are preferably low profile pneumatic air bags or springs. In one form a pair of air bags support a pivotally mounted entry section through a harness and when the air bags are deflated the entry section pivots downwardly with respect to the conveyor section. When the air bags are partially inflated the entry section is held horizontal. When the air bags are further inflated, the entire section tilts. The entire section tilts only when the succeeding section is clear and concurrently the entry section of the succeeding section also tilts to be aligned with the prior section providing an inclined idler roller ramp to permit the load to roll to the succeeding section. When the proper position of the load is achieved, the entry section returns to a horizontal position and the load rolls to a stop on the succeeding section. Each section includes a load stop which is retracted when the section is tilted. The entry section may be positioned on one or both ends of each section. In another form, the conveyor sections are supported by air actuators at each end and when one section tilts, the succeeding section also tilts so that both are aligned and tilted. Flank sections are provided for moving the loads around corners with such flank sections having intersecting idler roller conveyor sections. The system avoids load-to-load contact and operates entirely with low pressure air and low voltage wiring for the controls.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 2 is a side elevation of a linear section;

FIG. 3 is a top plan view of the linear section seen in FIG. 2;

FIG. 4 is an enlarged side elevation taken from the line 4—4 of FIG. 3 showing the three positions of the air bag actuator;

FIG. 5 is an enlarged fragmentary section of the air bag harness connection to the entry section of each linear zone;

FIG. 6 is an interior elevation on a reduced scale of the entry section lowered taken generally from the line 6—6 of FIG. 5;

FIG. 7 is an enlarged vertical section through the pivot as seen from the line 7—7 of FIG. 3;

FIG. 8 is a side elevation of the load stop;

FIG. 9 is a vertical section showing the load stop substantially from the line 9—9 of FIG. 8;

FIG. 12 is a vertical section of the smaller two-position air bag actuator used for the entry section in the flank zones as seen from the line 12—12 of FIG. 1;

FIG. 13 is an overall schematic of the loop system showing the low pressure controls for the air actuators and the low voltage electrical controls for each zone of the loop;

FIG. 14 is a schematic showing a portion of the pneumatic system and the three-position, four-way valve with a blocking center used for the linear sections and the two-position, three-way valves used for the flank zones;

FIGS. 15 through 18 are schematic side elevations of two adjacent linear zones showing the movement of the discrete load from one to the other;

FIG. 19 is a side elevation of a reversing embodiment of the present invention with three-position air actuators supporting both ends of each zone or section; and, FIG. 20 is a side elevation of a reversing embodiment utilizing three-position air actuators and pivoting entry sections at each end.

DETAILED DESCRIPTION OF THE PREFERRED EMBODIMENTS

Figure 1:
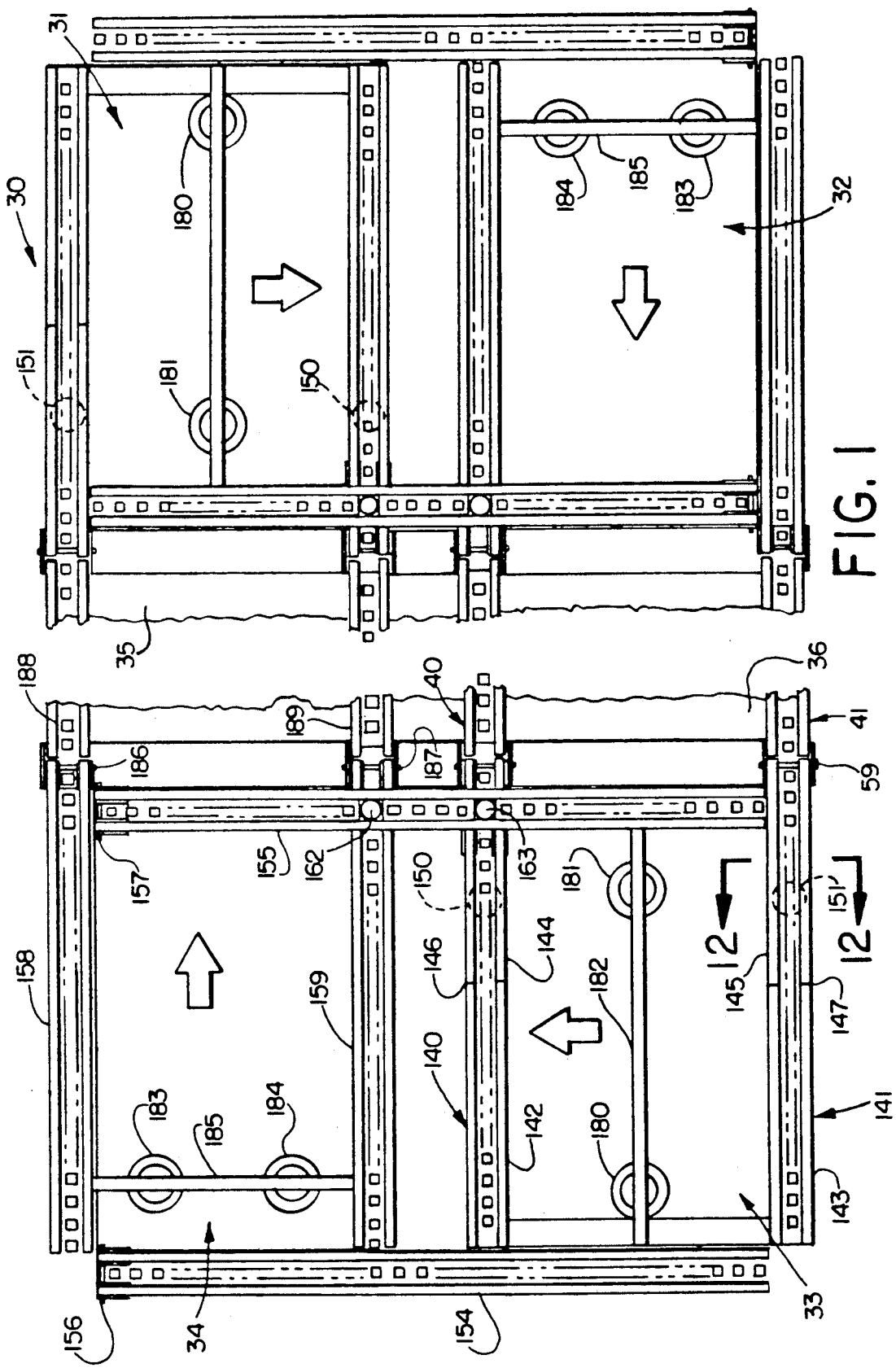
FIG. 1 is a top plan view of a loop layout of idler roll zones or sections with four flank sections being interconnected by two rows of linear sections which are broken away.

Referring first to FIG. 1 there is illustrated a loop conveyor system in accordance with the present invention shown generally at 30 which comprises flank zones or sections 31, 32, 33 and 34 which are interconnected by one or more linear zones or sections such as shown at 35 and 36.

A better illustration of an entire loop system is seen schematically in FIG. 13. The four corners of the loop are occupied by the flank zones 31 through 34 while the flank zones 31 and 34 are interconnected by three linear sections 35 and the flank zones 32 and 33 are interconnected by three linear zones 36. With the arrangement shown discrete loads may be moved from zone to zone around the generally rectangular loop shown. As indicated, one such utility for the loop arrangement illustrated is for the transportation and positioning of large bins in which automobile parts may customarily be packed and shipped. The zones labeled A, B and C shown at the top of FIG. 13 may be zones where fork lift trucks position full bins and remove empty bins. The operator may then control the positioning of full bins at zones F, G and H which may be situated at a strategic position along an automobile assembly line.

Referring now additionally to FIGS. 2-7 there is illustrated a linear conveyor section or zone which is formed of two parallel idler roll tracks 40 and 41 which are right and left hand versions of each other. In the illustrated embodiment, each track section or zone is approximately 8 feet long and about 5 feet wide and each zone is designed to accommodate a single discrete load having similar yet somewhat smaller dimensions. The size of the zones or sections however may vary widely depending upon the loads to be moved.

The right and left hand track sections each include a right and left hand outer frame shown generally at 43 and 44, each of which is fabricated from two different size channels. The outside frame 44 is fabricated from channels 46 and 47. The channel 47 is approximately twice the height of channel 46 and the profile configuration of such channels may be seen more clearly in FIGS. 9 and 7, respectively. The lower leg 48 of the deeper channel 47 is supported on base plate 49 which is in turn supported on the floor. Rigidly secured to the base plate are two upstanding triangular fulcrum plates 52 and 53 at one end of the section. At the opposite end a similar base plate 54 supports upstanding triangular fulcrum plates 55 and 56. The outer channel 46 includes a projecting ear 58 which is pivoted to pivot shaft 59 extending between the plates 55 and 56. A similar pivot shaft 60 extends between the upstanding triangular plates 52 and 53 at the opposite end.

The inside frame 43 is similarly fabricated from a channel 62 and a deeper channel 63, the profile configurations of which are shown in FIGS. 9 and 7, respectively. The deeper channel 63 has an inturned bottom leg 64 supported on the base 49. As seen in FIG. 3 the end of the channel 62 is provided with an ear 65 parallel and coextensive with the ear 58 also pivoted to shaft 59.

At the opposite end of the section or zone the somewhat deeper side walls of the channels 47 and 63 are provided with vertically extending arcuate slots seen at 67 and 68 in FIG. 7 which enable the entire section to be elevated at the right hand side as seen in FIG. 2 to pivot about the shaft 59 as hereinafter described.

As seen perhaps more clearly in FIG. 9, fixed within the outside frame channels 62 and 46 are roller side rails 70 and 71, respectively. These side rails are coextensive with the channels 62 and 46 and extend to the positions indicated at 72 and 73, respectively, in FIG. 3. The rails 70 and 71 are secured to or fixed with respect to the channels or outside frames 62 and 46.

Entry section rails of the same sectional configuration indicated at 75 and 76 extend from the points 77 and 78 to and slightly beyond the shaft 60. The profile configuration of these rails 75 and 76 may be seen in FIGS. 5 and 7. Accordingly there is a slight gap indicated generally at 80 in FIGS. 2 and 3 between the idler roll rails at each end of the section or zone.

The end of the entry section rails opposite the gap are each provided with a downwardly opening V-shape notch as indicated at 82 in FIGS. 2 and 4. Reinforcing the rails at the notch are saddles indicated at 83 and 84 which have the same interior notch configuration. The saddles are designed to seat on top of the shaft 60 and provide a firm support for the rails while also permitting the rails 75 and 76 to pivot slightly on such shaft. The rails 75 and 76 are not physically connected to the outside channels or frames 47 and 63 and may move inside such channels.

The rails serve to support a series of closely spaced idler rolls 86 one of which is shown in some detail in FIG. 5. The idler rolls are formed by swaging one end of a tube 87 to create an exterior angled flange 88. Bearings indicated at 89 and 90 are press fit in the ends of the tube and may include hex shafts 91 and 92, respectively, which fit in hexagonal holes in the respective rails. In the illustrated embodiment for such substantial bins or discrete loads, the rollers may be positioned on approximately 4-inch centers.

As seen more clearly in FIGS. 5 and 7 the rails 75 and 76 are secured by the fasteners indicated at 93 to an end 94 of harness 95. The harness extends from one track to the other and includes an elevated center portion 96 which is connected to the ends by the angled portions 97. The harness is supported by a pair of pneumatic air bags or springs seen at 98 and 99. The air bags or air springs simply comprise a bottom plate 100 and a top plate 101 with a bellows type elastomeric air bag 102 therebetween. The plates seal the upper and lower ends of the bellows and may be connected to the base extension 103 and the underside of the harness, respectively. Each air spring in provided with a pneumatic air inlet so that the pressure within the spring can be controlled.

The lower outer ends of the harness 95 project through a somewhat oversized slot 106 in the channel 63 as seen in FIG. 6. Also, as seen in such Figure, the upper edge or flange of such channel 63 is cut away to extend downwardly at approximately a 3 degree angle as indicated at 107. The cut away section extends to the gap 80 in the roller rails. This enables the rollers of the entry section supported by the rails 75 and 76 to move downwardly from a horizontal position to the position seen in FIG. 6. As hereinafter explained this may be accomplished by venting the air springs. When the air springs are partially inflated the entry section rollers return to the horizontal position with the rail 75 engaging the top flange 109 of the channel 47 as seen in FIG. 5. Also, the projecting tab seen at 110 in FIGS. 5 and 6 will engage the bottom of the adjoining fixed rail and channel as indicated at 111.

In this manner each track is provided with what may be termed a fixed section 112 and an entry section 113. A transverse rigid brace indicated at 114 is secured to and extends between the fixed sections. The entry sections are of course interconnected by the harness 95 which is of rigid square tubular construction.

In the embodiment illustrated in FIGS. 1-7 each track is pivoted to the left hand pivot seen in FIG. 3 but is free to move vertically with respect to the right hand pivot. This movement is permitted by the slots 67 and 68 and such tilting movement is obtained by further inflation of the air bags 98 and 99. It will also be seen that adjoining sections or zones share a common horizontal pivot. Thus as seen in FIG. 7 reading from left to right the shaft 60 is provided with a collar 116 on the exterior of the fulcrum plate 52. On the interior of the fulcrum plate is the ear 117 of the adjoining zone. Ear 117 is identical to the ear 58. The opposite ear of the adjoining zone is shown at 118, and each ear may be provided with an internal bushing as seen at 119. A collar is provided on the opposite end of the shaft as seen at 120.

As seen perhaps more clearly in FIG. 4 the air springs by being vented, partially inflated or fully inflated may achieve three different positions. When the air springs 99 are vented the entry section pivots downwardly from horizontal as seen by the phantom line position 122 for such rolls. When partially inflated the entry section is elevated to bring the rolls to a horizontal position as seen by the position 123. In such position the rolls are horizontally aligned with the rolls of the fixed section. Such pivoting takes place about the shaft 60 and is facilitated by the saddles described above.

When the air springs are fully inflated the entire idler conveyor section elevates or pivots upwardly about the opposite pivot 59, such tilting movement being permitted by the slots 67 and 68. The elevated or tilted position of the entire zone or section is shown at the phantom line position 124 and in such position the saddles 83 have lifted off the pivot 60.

Referring now to FIGS. 8 and 9 and also to FIG. 2 there is illustrated a brake or stop shown generally at 126 which is employed to release the load when the section tilts in its entirety and also to restrain the load to keep the load when the section tilts in its entirety and also to restrain the load to keep the load from rolling beyond the stop to an adjacent section. In this manner the discrete loads are kept from contacting each other as they are moved about the system. FIGS. 8 and 9 illustrate a mechanical form of stop which automatically submerges beneath the tangent plane of the upper surface of the idler rolls 86 when the conveyor section is tilted. It will however be appreciated that other forms of brakes or stops may readily be employed utilizing air actuators, for example.

The stop 126 comprises an upstanding arm or paddle 127 which projects between two adjacent idler rollers 86 and also between the roller rails. The paddle is secured to the end of lever 128 which is pivoted at 129 between two upstanding ears 130 and 131 secured to base extension 132. The opposite end of the lever is provided with a transverse bar 133 which simply engages the bottom of frame members 46 and 62. Because the center of gravity is to the left of the pivot as seen in FIG. 8, the weight of the stop will cause the stop to pivot as noted to and from the dotted line position 134 as the conveyor section is tilted to the dotted line position 135. Other types of brakes or retarders may be employed.

In order to move the discrete load around a corner or transversely there is provided flank zones 31, 32, 33 and 34 seen in FIG. 1 and also as zones D, E, I and J in FIG. 13. Referring initially to the flank zone 33 seen in FIG. 1, it is provided with two idler roller conveyor tracks indicated at 140 and 141 which are parallel and extensions of the conveyor tracks 40 and 41 of the linear section 36. Each of the conveyor tracks 140 and 141 is provided with a fixed section as seen at 142 and 143, respectively, and also an entry section seen at 144 and 145. The entry section is separated from the fixed section in each instance by the relatively small gaps indicated at 146 and 147. The respective entry sections 144 and 145 simply pivot downwardly to be aligned with the sections 40 and 41 when such sections tilt. When the load is rolling from the section 36 to the flank section 33 the entry sections are repositioned horizontal. Since the two sections 140 and 141 do not tilt in their entirety as do the linear sections, only a smaller two-position air spring is provided to support the entry sections as seen in FIG. 12. The smaller two-position air springs are shown at 150 and 151. The upper end of the air spring supports transverse plate 152 secured to the entry section tracks 153 and 154. Venting of the air spring permits the entry section to pivot downwardly within the side channels 155 and 156. Pressurization of the air springs brings the entry section to the horizontal position shown.

Extending transversely of the track sections 140 and 141 are two substantially longer track sections 154 and 155 which are more widely spaced because of the rectangular nature of the load. The conveyor tracks 154 and 155 are pivoted at 156 and 157, respectively. Such pivots are adjacent roller track 158 at the side of flank section 34. The track 155 intersects not only the track 140 of the section 33 but also track 159 of section 34.

Figure 10:
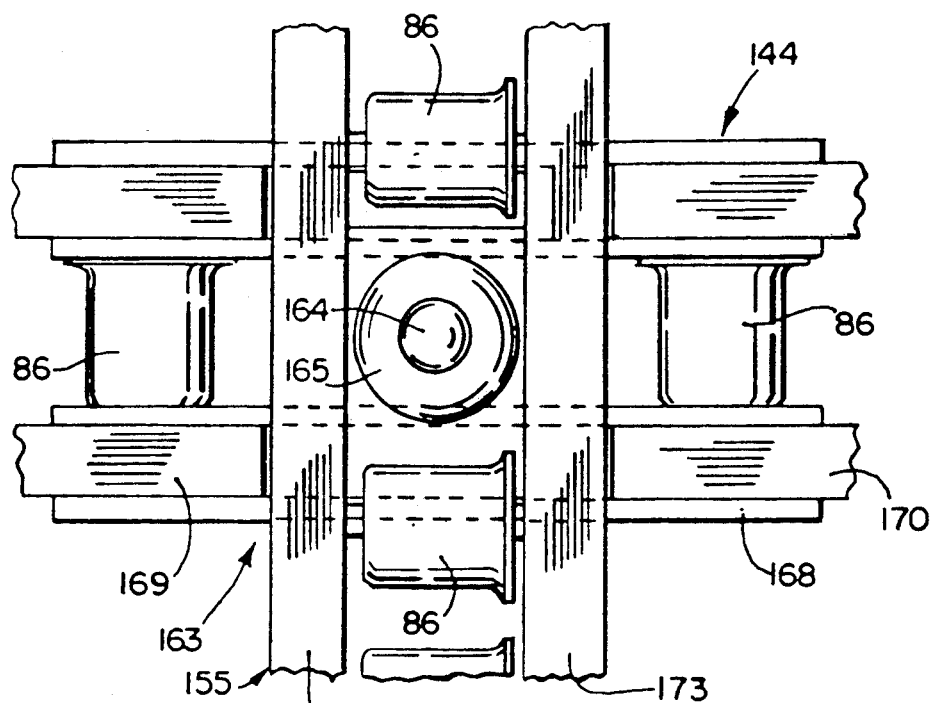
FIG. 10 is an enlarged fragmentary top plan view of the ball transfer at the intersection of the idler roller sections in the flank zone.
Figure 11:
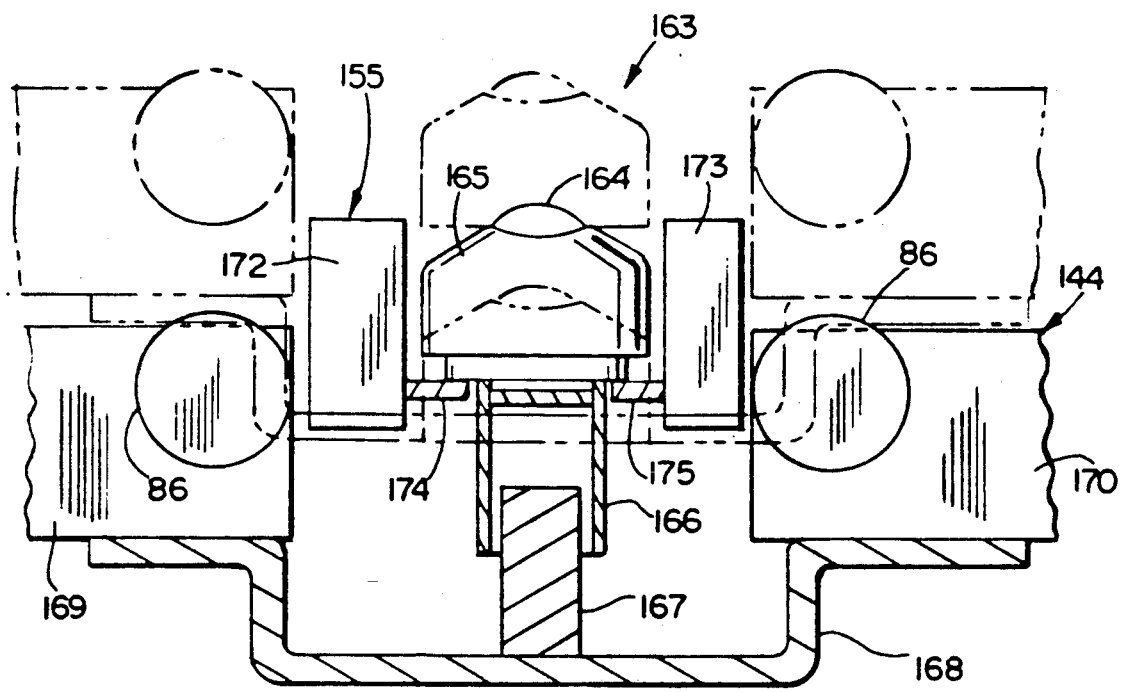
FIG. 11 is a vertical section of the ball transfer illustrating its movement with the elevating and tilting idler roller section.

At such intersections there are provided ball transfers as seen at 162 and 163, and as shown in detail in FIGS. 10 and 11. The ball transfer is simply a ball bearing 164 journaled in housing 165 and exposed at the top. From the base of the housing there extends a tube 166 which telescopes over an upstanding guide and retaining pin 167. The pin is mounted on a bridge bracket 168 which connects respective rail sections 169 and 170 of the conveyor section 144. The bridge bracket forms a gap in the rails which permits the ball transfer to be inserted halfway between the adjacent rolls 86. Also in such gap are the rails 172 and 173 of the track 155. Projecting inwardly from the rails 172 and 173 are tabs 174 and 175 which are adapted to engage the underside of the ball transfer on each side of the tube 166. The ball transfer while confined by the structure shown is not physically connected to either track section but is mounted to be picked up by the track section which is highest. Thus if the track section 144 is elevated above the track section 155 the top of the ball transfer will be aligned with the tops of the adjacent rollers 86 of that track section. Conversely if the track section 155 is higher the ball transfer will be picked up by the projections 174 and 175 and maintained at the proper elevation. The ball transfer will always be supported either by the projections 174 and 175 or by the top of the pin 167.

Referring again to FIG. 1 it will be seen that the zone 33 utilizes two more widely spaced air springs as seen at 180 and 181 interconnected by harness 182 also attached to the conveyor tracks 154 and 155. In this manner the tracks may be elevated from a depressed condition below the tracks 140 and 141 to an elevated or tilted position picking up the ball transfers 162 and 163 in the process to cause a discrete load to move from the zone 33 to the zone 34.

A suitable stop or retarder may be provided to ensure that the discrete load stops in the proper position to be in turn picked up by the conveyor tracks 158 and 159 when they elevate. The elevation of such tracks is obtained again by two air springs or bags indicated at 183 and 184 interconnected by harness 185 in turn connected to such tracks. Such tracks are pivoted at 186 and 187 which is a shared pivot with the entry sections 188 and 189 of the linear zone 35. The zone 33 is identical to the zone 31 at the opposite corner of the loop. Conversely the zone 34 is identical to the zone 32 at the opposite corner of the loop and the same air bag or air spring arrangement is employed. It will also be seen that only the zones 33 and 31 have entry sections which are operated by the smaller two-position air bags 150 and 151. However each of the linear sections have entry sections. Thus when the preceding section tilts the succeeding entry section also tilts creating an aligned inclined ramp which bridges adjoining sections. With the flank sections the discrete loads may be moved around the corners as indicated by the arrows in FIG. 1. The movement of the discrete loads from zone to zone will be described in more detail in connection with the schematic FIGS. 15-18.

Referring now to FIGS. 13 and 14 it will be seen that the entire system may be operated only with relatively low pressure air (60 psi for example) and low voltage electrical controls. Since each linear zone is operated by the larger air springs and which requires three positions, those air springs are operated by solenoid operated three-position four-way valves indicated at 200 which have a blocking center. In the schematic FIG. 13 the valve 200 is shown as controlling the zone F and receives its air supply from manifold or reservoir 201. The valve is shifted in one direction to vent the controlled air springs 202 and 203 and in the opposite direction to supply pressure to those air springs. When the air spring achieves its intermediate position holding the entry section in a horizontal position, the valve shifts back to the position shown in FIG. 14 blocking the air within the air spring. When the entire section is to be elevated, the valve shifts again supplying air pressure to the air springs. Three-position four-way valves with blocking centers are shown at 205, 206, 207, 208 and 209 operating zones C, G, H, B, and A, respectively.

The flank zones which do not require the intermediate position but only an up or down movement, may utilize a three-way two-position valve as seen at 212 in FIG. 14. These valves may be shifted by the single solenoid employed simply to provide a pressure (up) or vent (down) condition. The valve 212 in the schematic FIG. 13 is shown operating air springs 181 and 182. Such two-position valves also operate the smaller air springs 150 and 151 as well as the air springs 183 and 184 of the flank section 32 or zone E.

Also, as seen in FIG. 13, each zone is provided with a photoelectric eye indicated at 215. The photoelectric eyes sense the presence or absence of a load in a particular zone. A preceding zone will not operate or tilt unless the succeeding zone is empty. The photoelectric eyes also serve as position indicators to reposition the entry sections in horizontal condition as the discrete load rolls into the empty zone.

Each of the linear zones is also provided with a proximity switch as seen at 216 and a limit switch as seen at 217. The proximity switches may be employed to sense that the zone is at horizontal or below while the limit switches may be employed to determine that the zone has reached the horizontal position shifting the control valves to the blocking condition.

The flank zones are provided with the photoelectric eyes and limit switches but not the proximity switches. The sensors in each zone feed information to a programmable controller which in turn operates the respective solenoids of the control valves to obtain an automatic operation. The operation may be completely automatic or it may be partly automatic and manual. In any event the zones will not transfer a discrete load to the next zone unless that zone is empty. Accordingly, the loop lay-out seen in FIG. 13 will accommodate nine discrete loads at one time, which is one less than the total zones provided.

With reference now to FIGS. 15-18 there is illustrated the transfer of a discrete load shown at 230. The zone A includes the entry section 231 and the fixed section 232 while the zone B also includes an entry section 234 and fixed section 235. Each is supported by a set of air springs as indicated at 236 and 237, respectively, with the position or condition of the air springs being illustrated by the box immediately below the various sections.

Referring first to FIG. 15, for the transfer of the load 230 from the zone A to the zone B a number of conditions must be in effect. One condition is that the photo eye for zone B must show an empty zone. Another condition is that the photo eye in zone A must show a full zone. Further, zone B's proximity switch must show the zone at horizontal or below. Also, zone J, which is the preceding zone, must show the zone at horizontal as indicated by the limit switch.

Referring now to FIG. 16, after all of those situations are met, the zone B's down solenoid energizes deflating that zone's air springs 237 causing the entry section 234 to tilt downwardly. The energizing of the control solenoid for the B zone causes zone A's up solenoid to energize inflating the air springs 236 as shown creating a continuous aligned inclined ramp formed of the entire zone A and the entry section 34 of zone B.

Referring now to FIG. 17, as the load rolls onto the entry section 234 of zone B it shadows the photo eye 240 of zone B and unshadows the photo eye 241 of zone A. When the photo eyes indicate the proper position of the load, the up solenoid of the control valve of zone B's air springs 237 is energized inflating zone B's air spring until the limit switch stops the entry section at the horizontal position, simultaneously shifting the control valve to the center or blocked position This allows the load to roll onto the fixed section 235. Concurrently, the down solenoid controlling the air springs 236 is energized deflating zone A's air springs until the zone reaches the horizontal position and trips the limit switch returning the valve to the blocked position. In other words, the movement of the entry section of zone B and the repositioning of zone A to the horizontal condition occur concurrently and With the load in the approximate position seen in FIG. 17. The process is simply repeated to transfer the load from zone B to the next or succeeding zone.

Referring now to FIG. 19 there is illustrated a somewhat modified arrangement of conveyor sections. In FIG. 19 there are illustrated successive linear conveyor sections at 250, 251, 252 and 253. The conveyor sections are supported at each end by a set of air springs indicated at 254, 255, 256, 257, 258 and 259. Each air spring is controlled by the illustrated three-position four-way solenoid operated valve with a blocking center such as seen at 200 in FIG. 14 so that the air spring may achieve a lower, intermediate or upper position. A load may then be transferred from the section 251 to the section 252 by positioning the air springs 255 in the elevated position, holding the air springs 256 and 257 in the intermediate position, and positioning the air springs 258 in the lowered position. This creates an inclined roller ramp which will cause a discrete load on the section 251 to roll to the section 252. Again electric photo eyes may be employed to reposition the air springs in the intermediate position and the conveyors in the horizontal position at the appropriate position so that the load rolls to a gentle stop against a suitable physical stop or brake such as described above.

The advantage of a system such as shown in FIG. 19 is that the discrete load may be moved from section 251 to section 252 and then back again. In other words the discrete loads may move in either direction along the system.

A reversing movement may also be accomplished by the modification illustrated in FIG. 20. In FIG. 20 the conveyor section 270 is provided with a center fixed section 271 and entry sections 272 and 273 at each end. Both ends of the conveyor are provided with vertically extending arcuate slots 274 and 275 which permit each end of the conveyor section to be elevated to tilt in opposite directions, depending upon the operation of the three-position air springs 276 and 277 at each end. Accordingly, if the load is coming from the right as seen in FIG. 20 the entry section 230 will depress from the horizontal condition permitting a load to roll onto the section 270 in the same manner as in FIGS. 15-18. When the load leaves the section 270 the entire conveyor section will be elevated or tilted to align with the entry section of the next conveyor. If a load enters the section 270 from the left the entry section 272 will be depressed to create the ramp continuation from the adjoining section on the left. In the embodiments of FIGS. 19 and 20 loads may be moved in either direction.

The embodiments of FIGS. 19 and 20 are useful in various inventory and transportation applications. For example, reversing sections may be utilized in inventory and storage applications to store and retrieve discrete loads. A reversing section may be positioned on an elevator to stack discrete loads one above the other in various levels. Also, reversing sections may be employed in vehicles such as truck beds to load and then unload the vehicles. The various components of the present invention can be assembled to provide linear arrangements, loop arrangements, combinations of the above or reversing arrangements on several levels.

While the embodiments of the present invention utilize air springs, it will be appreciated that other types of actuators may be employed. Air springs of the type illustrated are advantageous however in that they can generate a substantial amount of force at relatively low air pressure. Also, such air springs can readily accommodate the tilting or misalignment of the upper and lower ends. Another advantage of such air springs is that the system may be construction in an extremely low profile with the entire system projecting approximately a foot or less from the floor.

It can now be seen that there is provided a low profile unpowered conveyor that can move substantial discrete loads in a safe and effective manner.

Although the invention has been shown with respect to certain preferred embodiments, it is obvious that equivalent alterations and modifications will occur to others skilled in the art upon the reading and understanding of this specification. The present invention includes all such equivalent alternations and modifications, and is limited only by the scope of the following claims.

I claim:

1. A low profile load conveyance comprising substantially horizontal adjoining individually tiltable idler roller conveyor sections adapted to support a load, means to tilt one section, and means to tilt at least part of an adjoining section to cause the load to roll from said one section to the adjoining section.

2. A conveyance as set forth in claim 1 including means to tilt all of the adjoining section whereby said one and adjoining section are tilted and substantially aligned.

3. A conveyance as set forth in claim 2 including air actuators supporting each end of each of said one and adjoining section.

4. A conveyance as set forth in claim 3 wherein each air actuator includes a lower, intermediate and elevated position.

5. A conveyance as set forth in claim 4 wherein said one and adjoining section are tilted by positioning the actuators at the adjacent ends of said one and adjoining sections in the intermediate position, and the actuators at the non-adjacent ends in the lowered and elevated position, respectively.

6. A conveyance as set forth in claim 5 wherein said actuators comprise air bags.

7. A conveyance as set forth in claim 1 wherein said adjoining section includes an entry section adjacent said one section, and means to tilt said entry section to be substantially aligned with said one section when tilted.

8. A conveyance as set forth in claim 7 including means responsive to the position of the load on the entry section to reposition said entry section horizontally.

9. A conveyance as set forth in claim 1 including means to sense that said adjoining section is empty prior to tilting of said one section.

10. A conveyance as set forth in claim 9 wherein said adjoining section includes a transverse section, and means to tilt the transverse section to cause the load to roll from said adjoining section transversely.

11. A conveyance as set forth in claim 10 including a ball transfer at the intersection of the adjoining and transverse section bridging the intersection, and means floatingly supporting said ball transfer to be substantially horizontally aligned with the uppermost of the intersecting roller conveyor sections.

12. A conveyance as set forth in claim 8 including means to tilt said adjoining section in like manner as said one section, to cause a load thereon to roll either back to said one section or to a further adjoining section.

13. A conveyance as set forth in claim 1 wherein said means to tilt said one section comprises an air actuator.

14. A conveyance as set forth in claim 7 wherein said means to tilt said entry section comprises an air bag.

15. A conveyance as set forth in claim 7 including means to tilt said adjoining section in like manner as said one section, to cause a load thereon to roll from said adjoining section, said means to tilt said entry section and said entire adjoining section comprising an air bag.

16. A conveyance as set forth in claim 15 wherein said means to tilt said entry and said entire section comprises a common air bag, means responsive to the venting of the air bag to tilt the entry downwardly from horizontal, means responsive to the partial pressurization of said air bag to tilt the entry section upwardly to horizontal, and means responsive to further pressurization of said air bag to tilt the entire section.

17. A conveyance as set forth in claim 1 including a load stop on said one section projecting above the idler rollers, and means resposive to the tilting of said one section to submerge said stop.

18. An idler conveyor section comprising a low profile idler roll section adapted to support a load a short distance above a floor, means pivotally supporting one end, means to elevate the opposite end to cause a load thereon to roll by gravity from the section,, and an entry section separately pivotal with respect to the entire section to facilitate a load rolling onto said section.

19. An idler conveyor section as set forth in claim 18 wherein said section may be pivoted at each end to enable a load to roll from either end, and a separately pivotal entry section at each end to facilitate a load rolling onto said section from either end.

20. A idler conveyor section as set forth in claim 18 including a common air actuator for said entry section and the entire section.

21. An idler conveyor section as set forth in claim 20 wherein said air actuator includes a lower position, an intermediate position and an upper position, said lower position tilting the entry section downwardly with respect to the entire section, said intermediate position maintaining said entry section and said entire section horizontal, and said upper position tilting said entire section.

22. An idler conveyor section as set forth in claim 21 wherein said air actuator is an air bag.

23. An idler conveyor section as set forth in claim 22 including means responsive to the venting of the bag to achieve the lower position, the partial pressurization of the bag to achieve the intermediate position, and the further pressurization to achieve the upper position.

24. An idler conveyor section as set forth in claim 23 including a plurality of air bags for each section, said air bags being interconnected by a harness in turn connected to said entry section.

25. An idler conveyor section as set forth in claim 18 wherein said means pivotally supporting one end and said means to elevate the opposite end comprise air actuators supporting each end, 26. An idler conveyor section as set forth in claim 25 wherein each air actuator includes a lower, intermediate and elevated position.

27. An idler conveyor section as set forth in claim 26 wherein said section is tilted by positioning the air actuators at one end in the intermediate position and the air actuators at the opposite end in either the lower or elevated position.

28. An idler conveyor section as set forth in claim 27 wherein each air actuator comprises an air bag.

29. An idler conveyor section as set forth in claim 28 including a second adjoining section supported in the same way whereby both sections may be tilted and aligned.

30. An idler conveyor section as set forth in claim 18 wherein each section comprises a parallel series of idler rollers, each roller having an exterior flange.

31. An idler conveyor section as set forth in claim 30 wherein each roller is formed of a swaged tube with a bearing press fitted therein.

32. An idler conveyor section as set forth in claim 30 wherein each roller is in the form of a tube flared at one end and with bearings press fit in each end.

33. A method of transporting discrete loads on an idler conveyor having a plurality of adjoining individually tiltable sections comprising the steps of tilting one section of the conveyor to cause a discrete load to roll from said one section to an adjoining section, and sequentially tilting each succeeding section to cause the load to move from section to section.

34. A method as set forth in claim 33 including the step of tilting at least a portion of each succeeding section to be substantially aligned with the preceding section to enhance the momentum of the load from section to section.

35. A method as set forth in claim 33 including the step of tilting only an entry section of each succeeding section.

36. A method as set forth in claim 34 including the step of tilting the entire succeeding section.

37. A method as set forth in claim 34 including the step of sensing the position of the moving load and then repositioning the succeeding section as the load is moving onto it.

38. A method as set forth in claim 37 including the step of restricting the discrete loads from contact with each other.

39. A method as set forth in claim 38 including the step of sensing that the succeeding section is empty before tilting the preceding section.

40. A method as set forth in claim 33 including the step of providing certain sections with intersecting idler conveyors, and tilting the intersecting conveyors whereby the discrete loads may move laterally from such certain sections.

41. A method as set forth in claim 35 including the step of utilizing low profile air bags to obtain such tilting.

42. A method as set forth in claim 35 including the step of utilizing a common air actuator to tilt both the entry section and the entire section of which the entry section is part.

43. A method as set forth in claim 42 wherein said air actuator is vented to tilt the entry section downwardly, partially pressurized to hold the entry section horizontal, and fully pressurized to tilt the entire section.

44. A method as set forth in claim 41 wherein said air bags are positioned at each end of each section, each air bag including a lower, intermediate and elevated position, whereby adjoining sections may be tilted and substantially aligned with the air bags at the adjacent ends of the adjoining sections being in the intermediate position while the air bags at the non-adjoining ends are lowered and elevated, respectively, or vice versa.

45. A method as set forth in claim 36 including the step of utilizing air actuators to tilt said sections, said air actuators selectively moving the ends of adjoining sections to lower, intermediate, or elevated positions, whereby adjoining sections may be tilted in either direction and aligned.

46. A method as set forth in claim 45 wherein said air actuators are positioned at each end of each section, with the actuators at the adjacent ends of the adjoining sections being in the intermediate position while the actuators at the non-adjoining ends are lowered and elevated, respectively, or vice versa.

* * * * *